United States Patent [19]

Kelley et al.

[11] Patent Number: 4,833,337

[45] Date of Patent: May 23, 1989

[54] INDUCTIVE COUPLED POWER SYSTEM

[75] Inventors: Arthur W. Kelley; William R. Owens, both of Rockford, Ill.

[73] Assignee: Sundstrand Corporation, Rockford, Ill.

[21] Appl. No.: 223,703

[22] Filed: Jul. 21, 1988

Related U.S. Application Data

[63] Continuation of Ser. No. 920,108, Oct. 16, 1986.

[51] Int. Cl.[4] .......................... H02J 1/00; H04N 1/00; H04M 11/04

[52] U.S. Cl. .......................................... 307/11; 455/3; 455/41; 340/310 A; 381/79; 333/24 R

[58] Field of Search .................................... 307/11-13, 307/17, 91, 35, 62, 83; 455/41, 3; 333/24 R, 177, 1, 100; 336/174, 175; 381/179

[56] References Cited

U.S. PATENT DOCUMENTS

| | | | |
|---|---|---|---|
| 1,866,751 | 7/1932 | Butow | 336/174 |
| 2,415,688 | 2/1947 | Hall, Jr. | 455/41 |
| 2,567,431 | 9/1951 | Halstead | 455/41 |
| 2,851,592 | 9/1958 | Webster, Jr. | 455/77 |
| 3,368,137 | 2/1968 | Kennard et al. | 336/175 X |
| 3,401,469 | 9/1968 | Shaver et al. | 455/610 X |
| 4,352,200 | 9/1982 | Oxman | 405/41 |
| 4,428,078 | 1/1984 | Kuo | 455/3 |

*Primary Examiner*—William M. Shoop, Jr.
*Assistant Examiner*—Sharon D. Logan
*Attorney, Agent, or Firm*—Wood, Dalton, Phillips, Mason & Rowe

[57] ABSTRACT

An inductive coupled power system has a transmission circuit with a dual primary comprising two conductor loops. First segments of the loops extend through an area served by the system adjacent each other and second segments of the loops extend through the area one on either side of the adjacent first segments. A small loop configuration minimizes the stray magnetic field. A secondary pickup assembly has a U-shaped core with two legs which embrace the first segments of the two loops and a core element adjacent the first loop segments is positioned between the ends of the legs. Each of the power circuits of a plurality of loads includes a shunt regulator.

17 Claims, 2 Drawing Sheets

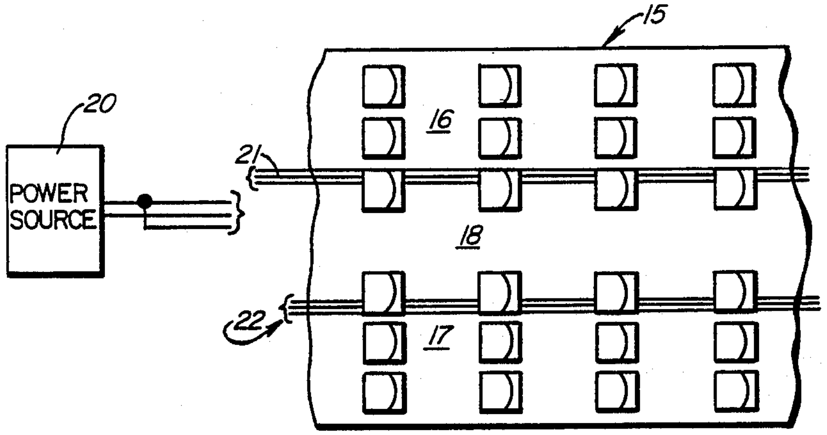
FIG. 1
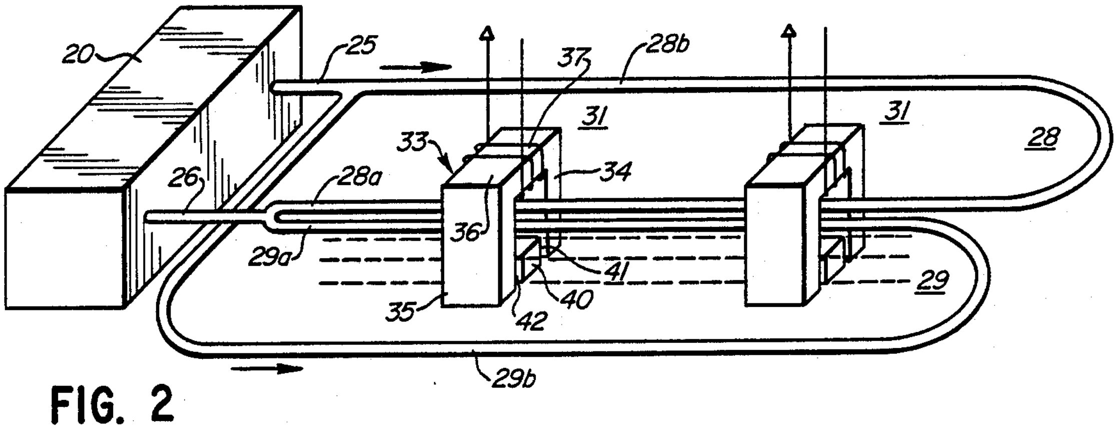
FIG. 2
FIG. 3
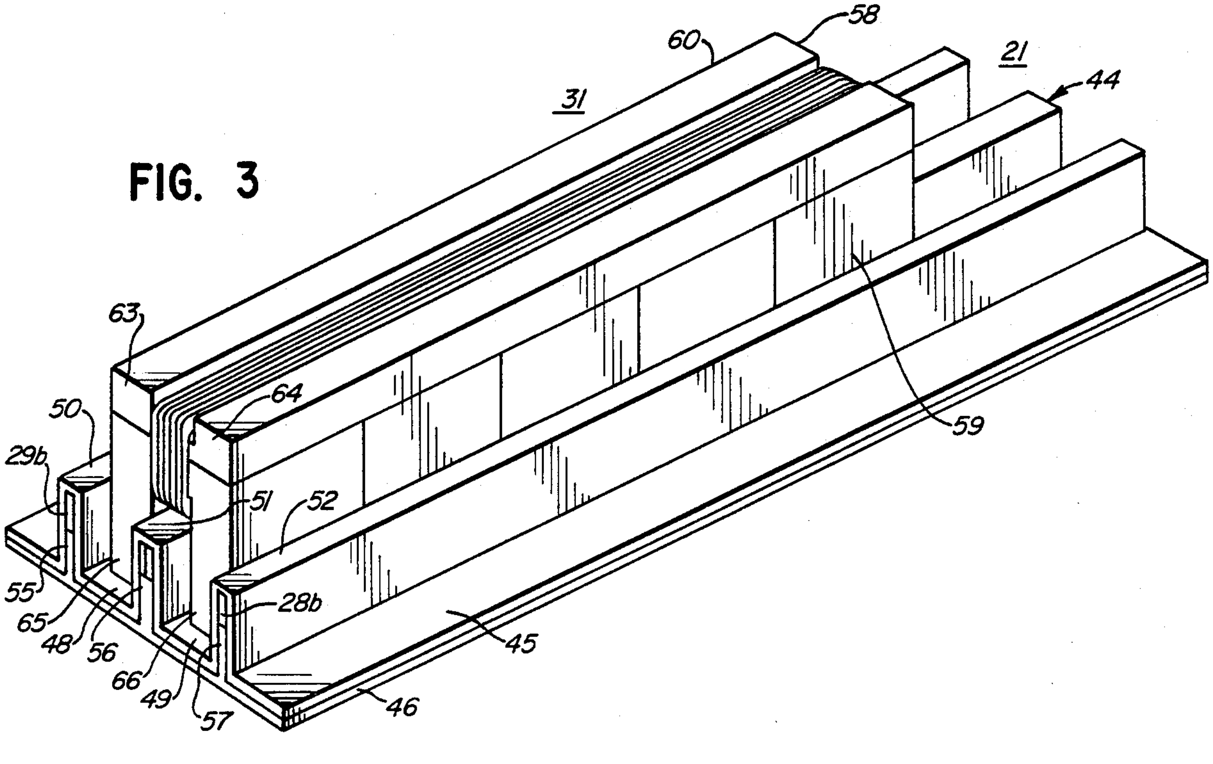

FIG. 4
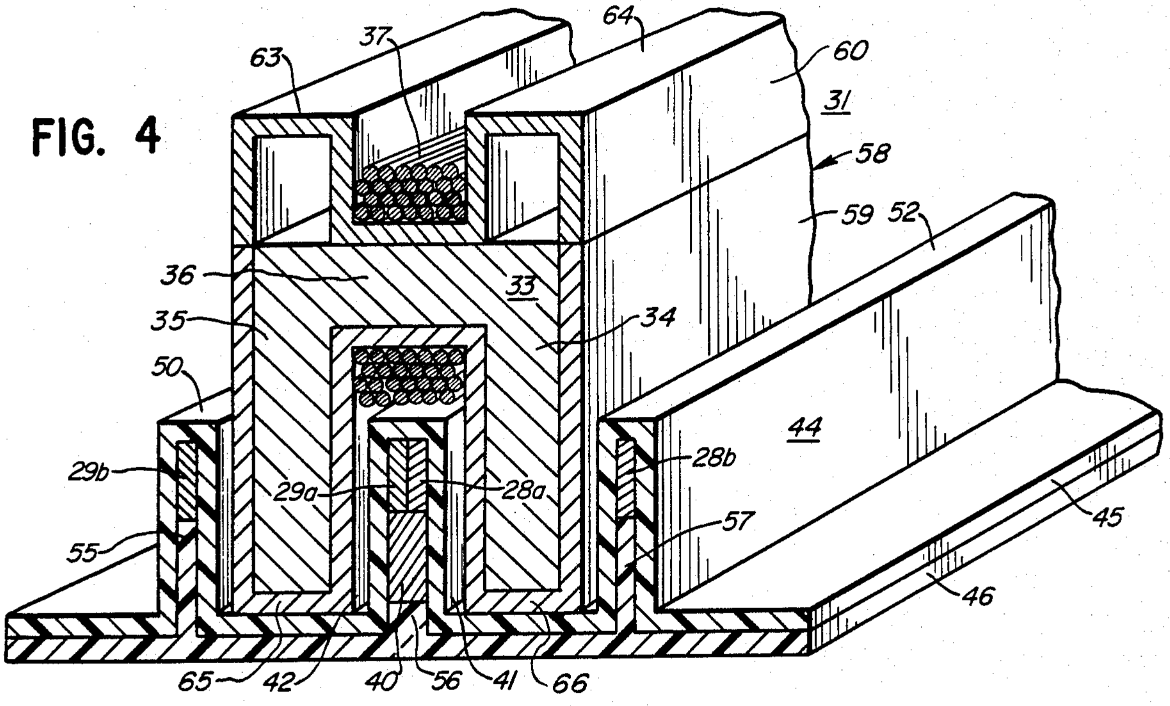
FIG. 5
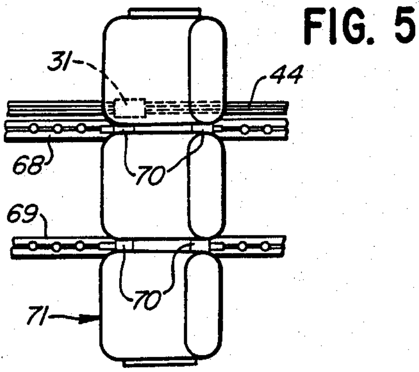
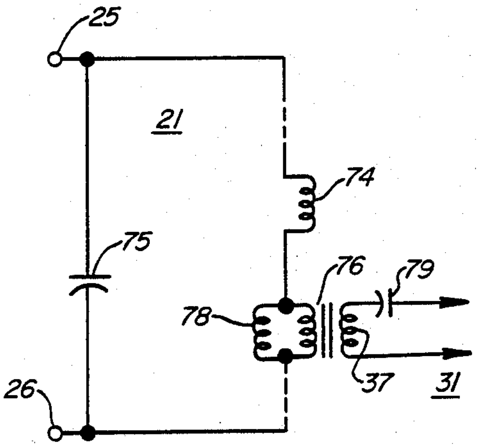
FIG. 6
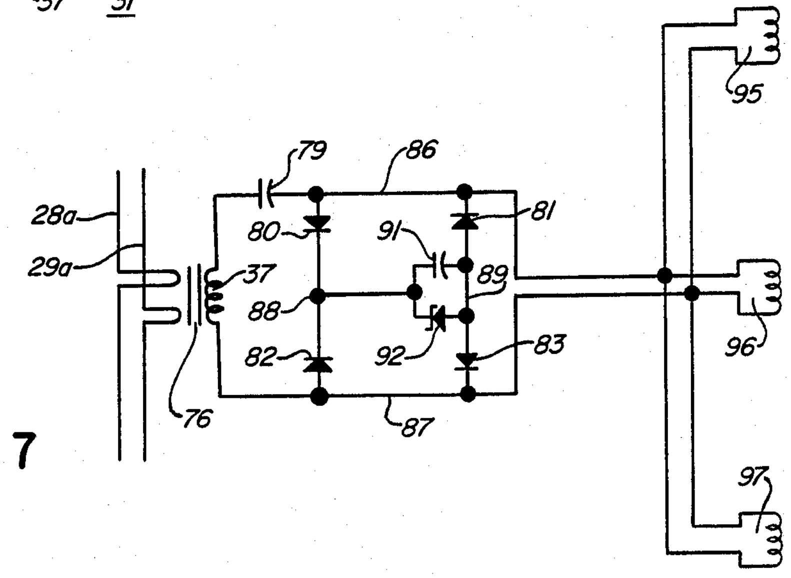
FIG. 7

INDUCTIVE COUPLED POWER SYSTEM

This application is a continuation of application Ser. No. 920,108, filed Oct. 16, 1986.

This invention relates to an inductive coupled power system and to a transmission circuit, pickup and secondary regulator circuit for use therein.

BACKGROUND OF THE INVENTION

Kuo U.S. Pat. No. 4,428,078 shows an inductive coupled power and signal system for aircraft passenger entertainment. The primary circuit transmission line extends in a large loop throughout the aircraft cabin. Each seat group has a pickup loop inductively coupled to the transmission line. The system provides electrical power and information signals, as an audio program, to receive circuits at the aircraft seats through inductive coupling which permits the seat group spacing to be changed without reconnecting or rewiring the electrical circuits. The Kuo system is inefficient and the large loop transmission line develops a high level magnetic field which can cause interference with other aircraft systems.

SUMMARY OF THE INVENTION

The power system disclosed herein utilizes a novel transmission circuit which minimizes the magnetic field; and a pickup assembly which affords efficient coupling of power to the receiver circuits.

More particularly, one feature of the invention is a dual primary transmission circuit comprising two conductor loops connected with the source and extending through an area containing receivers, each loop having a first segment connected with one source terminaland a second segment connected with the other source terminal, the first segments of the two loops extending through the area adjacent each other and the second segments of the loops extending through the area, one on either side of the adjacent first segments. The second conductor loop segments are positioned closely one on either side of the two adjacent first conductor loop segments and all conductor loop segments are substantially coplanar. The small loop configuration minimizes the stray magnetic field.

Another feature of the invention is that the secondary pickup assembly includes a U-shaped core having two legs with a secondary circuit coil on the core, the legs of the U-shaped core embracing the first segments of the two conductor loops, for inductive coupling of a signal between the transmission and secondary circuits. The ends of the legs of the pickup core extend beyond the transmission circuit conductor loop segments and a core element adjacent the first conductor loop segments is positioned between the ends of the secondary pickup core legs forming a magnetic circuit with two air gaps.

A further feature of the invention is that the transmission circuit has a track-like cover with two channels separating the first loop segments in the center and the second loop segments on the outside. The legs of the U-shaped pickup are received in the channels.

Yet another feature of the invention is that each of the power circuits of a plurality of loads for the transmission circuit includes a shunt regulator whereby the impedance of each of the loads is regulated and power is divided among the loads.

Further features and advantages of the invention will readily be apparent from the following specification and from the drawings, in which:

FIG. 1 is a diagrammatic illustration of the power system installed in an aircraft cabin;

FIG. 2 is a diagrammatic illustration of the power transmission circuit with two secondary pickup assemblies;

FIG. 3 is a perspective of a section of the transmission circuit with a secondary pickup assembly;

FIG. 4 is an enlarged perspective cross-section through the transmission circuit and secondary pickup;

FIG. 5 is an enlarged plan view of a seat group, the seat track, the electrical transmission circuit and a pickup assembly.

FIG. 6 is a schematic diagram illustrating the impedance compensation between the transmission line and a pickup; and FIG. 7 is a schematic diagram of a secondary circuit with a shunt impedance regulator.

The invention is illustrated and will be described as incorporated in a passenger aircraft. It is in this environment that the system is particularly useful. Many features, however, can be used in other power distribution systems, as in an office for example.

A plan view of a transverse section of an aircraft cabin 15 is shown in FIG. 1. Two seat sections 16, 17 are separated by an aisle 18. A power source 20 is connected with two power transmission circuits 21, 22 serving the seat sections 16, 17, respectively. In each section the seats are arranged in rows. Each row in each section is a seat group, here shown as three seats. In a typical commercial aircraft, seat groups are mounted in seat tracks (not shown in FIG. 1) and may be positioned longitudinally of the aircraft for a desired seat spacing configuration. Where the seats have electrical plug connectors for electrical service, audio signals, lighting control and the like, the electrical connectors must be mated and demated when the seats are moved and the choice of seat configuration is limited. With the connectorless electrical systems of Kuo and as disclosed herein, any seat spacing may be used and mating and demating of connectors is eliminated.

As discussed in Kuo, audio signals can be transmitted between the source or head end of the system and circuits (not shown in detail) at each seat. In addition, video and data signals can be transmitted to provide audio and video entertainment to the passengers, seat light control, attendant signaling or the like from the seat passenger to a central station associated with the power unit.

The power source 20 provides AC power at 28 kilohertz and has two terminals 25, 26. The power source is shown in FIG. 2 with one of the transmission circuits of FIG. 1. Each transmission circuit has a dual primary with two conductor loops 28, 29. Each conductor loop has a first segment ***28a*, *29a* both connected with one terminal 26 of the power source. The loops 28, 29 have second segments *28b*, *29b* connected with the other power source terminal 25. The first loop segments *28a*, *29a* extend through the area served by the power system adjacent each other. The second loop segments *28b*, *29b* extend through the area spaced from and one on either side of the adjacent first segments. The four circuit loop segments *28a*, *29a*, *28b*, *29b*** are preferably substantially coplanar.

The 28 kilohertz frequency is selected to minimize interference of the fundamental and its principal harmonics with other signals used in navigating or operating the aircraft. Other power frequencies could be used.

A receiver is typically provided for each seat group, here shown as three seats in a row. Each receiver includes a secondary pickup assembly 31, two of which are shown diagrammatically in FIG. 2.

The secondary pickup assembly has a U-shaped core 33 which may be of ferrite. The U-shaped core 33 has legs 34, 35 which embrace the primary conductor (first loop segments 28*a*, 29*a*) and a center section 36 on which a multi-turn secondary coil 37 is wound. Physically associated with the first segment conductors 28*a*, 29*a* is a ferrite bar 40 which is positioned between the ends of the core legs, 34, 35 and completes the magnetic circuit. Ferrite is a brittle material and the bar 40 which extends the length of conductor segments 28*a*, 29*a* (as indicated by broken lines) is preferably made up of short sections having a length of the order of one-half inch.

Two air gaps 41, 42 between the legs 34, 35 and bar 40 have a constant total dimension regardless of the relative position of the secondary core with respect to the bar. The transmission circuit and the secondary pickup assembly form a transformer with the conductor loops 28, 29 constituting a single turn, two conductor primary, and the winding 37 a multi-turn secondary. Further details of the power circuit for a receiver are discussed below.

The two conductor loops 28, 29 providing a small area circuit which tends to limit the stray magnetic fields. This further reduces the risk of interference between the seat electrical system and navigational or operational equipment of the aircraft.

A preferred physical embodiment of the transmission circuit 21 and the pickup assembly 31 is shown in detail in FIGS. 3 and 4. The transmission circuit segments 28*a*, 29*a*, 28*b* 29*b* are preferably rectangular crosssection litz conductors. The transmission circuit conductors and ferrite bar 40 have a track-like housing 44 of insulating material with a cover 45 and base 46. Cover 45 has two channels 48, 49 defined by upwardly extending, downwardly opening pockets 50, 51 and 52. Base 46 has longitudinally extending ribs 55, 56 and 57 which extend into the pockets 50, 51 and 52, respectively. The cover and the base may be molded or extruded of plastic material. The first conductor loop segments 28*a*, 29*a* are located side-by-side in the center pocket 51, above the ferrite bar 40. The second conductor loop segments 29*b*, 28*b* are located in pockets 50, 52, respectively, substantially coplanar with the first conductor segments 29*a*, 28*a*. Base ribs 55, 56 and 57 hold the conductors and ferrite bar in place.

Pickup assembly 31 also has a nonconductive housing 58 with a U-shaped section 59 and a ribbed cover 60. Housing section 59 receives the U-shaped ferrite core 33. Cover 60 has longitudinally extending lateral ribs 63, 64 which with the housing legs 65, 66 define a bobbin on which secondary coil 37 is wound.

For the aircraft system disclosed herein, the track housing 44 may have a height of the order of O.750" and a width of the order of 2.5". The width of each channel is 0.5". The pickup assembly legs have a width of 0.375" and the height of the pickup assembly is 1.625". The thickness of the plastic housing is 0.062" and the overall height of the track and pickup is 1.75". The close spacing of the conductor loop segments minimizes the extent of the stray magnetic field.

As best seen in FIG. 5, two seat mounting tracks 68, 69 extend longitudinally of the aircraft in the cabin floor and receive the legs 70 of a seat group 71. The power track 44 is also located in the cabin floor and extends parallel with the seat mounting track 68. Pickup assembly 31 is physically mounted to the seat group with the legs 65, 66 extending into track channels 48, 49. As the seats are moved longitudinally of the aircraft to change the seat spacing, the pickup slides in the track.

The difference of 0.125" in nominal width of the pickup assembly legs 65, 66 and the track channels 48, 49 provides adequate tolerance to avoid binding between the track and pickup as the seat group is moved. The difference in dimension and the thickness of the plastic track and pickup covers 44, 58 provide and effective gap of 0.250" in the magnetic circuit of the U-shaped core 33 and ferrite bar 40.

The seat mounting tracks 68, 69 have a cover between seat groups, not shown in FIG. 5. The power transmission track 44 preferably has a conductive cap (not shown) between pickup units, which keeps out foreign objects and reduces electromagnetic radiation and interference.

FIG. 6 is a simplified equivalent circuit for the power transmission system. Circuit 21 is connected with power source terminals 25, 26. Inductor 74 represents the inductance of the conductor loops and is a function of the loop length. Capacitor 75 is in the power source 20 and compensates for the reactance of the conductor loop. Its value is also a function of loop length. Transformer 76 represents the inductive coupling between the primary conductor loops 28, 29 and the secondary coil 37 of the pickup assembly. Inductor 78 represents the source impedance as seen from the load. Capacitor 79 in the pickup load power circuit compensates for the source impedance, inductor 78, in parallel with the transmission loop reactance.

In FIG. 7 a portion of the seat group power circuit is shown with a shunt regulator which establishes the impedance of the power circuit so that power is appropriately divided among the several loads connected with the power transmission circuit. The conductor loops 28, 29 form the primary of pickup assembly transformer 76. The secondary winding 37 is connected through compensating capacitor 79 with a bridge circuit of diodes 80, 81, 82, 83. Terminals 86, 87 of the diode bridge are connected across the transformer secondary 37 and a DC shunt regulator circuit is connected across the bridge terminals 88, 89. The shunt regulator circuit includes the parallel combination of capacitor 91 and a Zener diode 92. When the voltage across capacitor 91 exceeds the break-down voltage of Zener diode 92, the diode conducts regulating the DC voltage across bridge terminals 88, 89 and the AC voltage across bridge terminals 86, 87. The regulated AC is connected with the primary windings 95, 96 and 97 for AC circuits associated with the three seats of seat group 71. If DC power is needed, it is distributed from terminals 88, 89. In a typical system the Zener diode 92 for each of the loads will have the same voltage characteristic. Thus, the impedance of the power circuit for each load will be the same and power will divide equally among the system loads.

If more accurate regulation of voltage is desirable, Zener diode may be replaced with a closed loop feedback circuit. The output voltage is monitored and the shunt impedance is varied accordingly.

We claim:

1. In a system for inductive coupling of AC power from a source having two terminals to each of a plurality of receiver units, a transmission circuit, comprising:
two conductor loops connected with said source and extending through an area containing said receiver units,
a first segment of the two loops being connected with one source terminal and
a second segment of each loop being connected with the other source terminal,
the first segment of the two loops extending through the area and the second segments of the two loops extending through the area one on either side of said first segment.

2. The transmission circuit of claim 1 in which said conductor loop segments are substantially coplanar.

3. The transmission circuit of claim 2 in which each of said second conductor loop segments is spaced from the two adjacent first conductor loop segment.

4. The transmission circuit of claim 1 in which each of said conductor loop segments is generally rectangular in cross-section.

5. The transmission circuit of claim 2 for operation at a frequency of the order of 28 KHz, in which said conductor loops are of litz wire.

6. The transmission circuit of claim 3 with an insulating housing for said conductor loops, the housing having means which engage each of the segments of the conductor loops to maintain the segments in said spaced relationship.

7. The transmission circuit of claim 6 in which said housing has three parallel, longitudinally extending, spaced apart eoplanar conductor pockets with the first segment of the two conductor loops in the center pocket and one of the second segments of the conductor loops in each of the outer pockets.

8. The transmission circuit of claim 7 in which said housing includes a base with three longitudinally extending ribs which extend into the pockets, positioning the conductor loop segments therein.

9. An inductive power coupling system comprising the transmission circuit of claim 1 in combination with a secondary pickup assembly for a receiver unit, including:
a U-shaped core having two legs; and
a secondary circuit coil on said core, the legs of said U-shaped core embracing the first segment of the two conductor loops to couple a signal between the transmission and secondary circuits.

10. An inductive power coupling system comprising the transmission circuit of claim 3 with a secondary pickup assembly for a receiver unit including:
a U-shaped core having two legs; and
a secondary circuit coil on said core, the legs of said U-shaped core embracing the first segment of the two conductor loops and being between said first segment and said second segments.

11. An inductive power coupling system comprising the transmission circuit of claim 7 in which said housing has two channels, one between the center pocket and each of the other pockets, and a secondary pickup assembly unit for a receiver, including:
a U-shaped core having two legs; and
a secondary circuit coil on said core, the legs of said U-shaped core extending into said channels and embracing the first segment of said two conductor loops.

12. The inductive power coupling system of claim 9 in which the legs of the pickup core have ends which extend beyond the conductor loop segments and including a core element adjacent the first conductor loop segment and between the ends of the secondary pickup core legs.

13. The inductive power coupling system of claim 11 in which the legs of the pickup core are longer than the crosssectional dimension of the conductor loop segments and including a core element adjacent the first conductor loop segment and between the legs of the secondary pickup core.

14. In an inductive power coupling system having a primary circuit conductor, a secondary pickup assembly, comprising:
a U-shaped core having two legs; and
a secondary circuit coil on said core, the legs of said U-shaped core embracing said primary circuit conductor to couple a signal between the primary and secondary circuits.

15. The secondary pickup assembly of claim 14 in which said U-shaped core has a center section between said two legs and said coil extends about said center section.

16. The secondary pickup assembly of claim 14 having an insulating cover on said core with said secondary circuit coil outside said cover.

17. The transmission circuit of claim 1 in which each of the two conductor loops has a separate first segment and the two first segments extend through the area adjacent each other.

* * * * *